United States Patent [19]
Ramanathan

[11] Patent Number: 5,948,107
[45] Date of Patent: Sep. 7, 1999

[54] METHOD OF HANDLING ERRORS IN COMPLEX INHERITANCE HIERARCHIES

[75] Inventor: Ramanathan Ramanathan, Beaverton, Oreg.

[73] Assignee: Intel Corporation, Santa Clara, Calif.

[21] Appl. No.: 08/864,318

[22] Filed: May 28, 1997

[51] Int. Cl.$^6$ .................................................. G06F 11/00
[52] U.S. Cl. .............................................. 714/2; 395/683
[58] Field of Search ............................ 395/181, 182.01, 395/182.13, 182.16, 182.19, 183.15, 185.1, 600, 700, 500, 650, 575, 500.43, 683; 714/2, 15, 25, 33, 38, 39, 47, 48, 49

[56] References Cited

U.S. PATENT DOCUMENTS

| | | | |
|---|---|---|---|
| 5,307,490 | 4/1994 | Davidson et al. | 395/650 |
| 5,379,407 | 1/1995 | Todd | 395/575 |
| 5,437,025 | 7/1995 | Bale et al. | 395/600 |
| 5,455,949 | 10/1995 | Conder et al. | 395/700 |
| 5,701,487 | 12/1997 | Arbouzov | 395/704 |
| 5,740,354 | 4/1998 | Ben-Natan et al. | 395/183.21 |
| 5,778,369 | 7/1998 | Pascoe et al. | 707/100 |

Primary Examiner—Robert W. Beausoliel, Jr.
Assistant Examiner—Nadeem Iqbal
Attorney, Agent, or Firm—Blakely, Sokoloff, Taylor & Zafman

[57] ABSTRACT

A method of handling errors in complex inheritance hierarchies. A complex inheritance hierarchy is derived so as to have a single common ancestor, the base class, at the top of the hierarchy. The base class has an error handler class nested inside to handle errors occurring in the hierarchy. When an error occurs in a class in the hierarchy, an error message is pushed on a stack accessible by the error handler subject to certain conditions. In one embodiment, the conditions include either the recoverability of the error, the severity of the error, or both. In an embodiment in which a condition is recoverability, an error that is successfully recovered does not require an error message be pushed on the stacks as no further handling is required.

If an error message is pushed on the stack, an error signal is then returned to the calling class. Unless the error is such that it can be recovered or ignored, the error will be propagated to the application, making an initial call to the hierarchy, with each class along the way adding its own error message to the stack within the base class.

8 Claims, 7 Drawing Sheets

METHOD OF HANDLING ERRORS IN COMPLEX INHERITANCE HIERARCHIES

BACKGROUND OF THE INVENTION (1) Field of the Invention

The invention relates to computer systems. More specifically, the invention relates to error handling in an inheritance or nested hierarchies of arbitrary depth.

(2) Related Art

In object-oriented programming, one object is frequently derived from another object with a third object being derived from the second object, and so forth. This is known as collaboration by inheritance. When an inheritance hierarchy is arbitrarily deep, the handling of errors at the various levels of inheritance becomes very complex. The complexity of error handling becomes exponentially proportional and, in the worst case, will be on the order of $2^N$ where N is the depth of the hierarchy.

When an error occurs in a prior art inheritance hierarchy, no clear protocol exists for handling the error. This leaves open the questions of whether the object handles the error by itself. Whether if at all, the parent is informed that an error has occurred. In other words, there is no uniform handling of errors in inheritance hierarchies. Rather, each hierarchy may handle errors in a unique way. This does not facilitate code reuse and ultimately results in longer and slower source code. Similarly, because there is no uniform way of handling errors, there is no uniform acts that can be expected when a severe error occurs, nor is there any procedure for notification of the application when an error can be bypassed or ignored. Moreover, from a programmer's perspective, it is often desirable to be able to determine at what level the error is generated and which objects are responsible for it. Prior art error handling on an ad hoc basis fails to address these issues.

Accordingly, it would be desirable to have a system for uniformly handling errors in an arbitrarily deep inheritance hierarchy. It would be desirable to be able to identify an underlying source of a high level error to permit the underlying cause of the error to be treated.

BRIEF SUMMARY OF THE INVENTION

A method of handling errors in complex inheritance hierarchies is disclosed. A complex inheritance hierarchy is derived so as to have a single common ancestor, the base class, at the top of the hierarchy. The base class has an error handler class nested inside to handle errors occurring in the hierarchy. When an error occurs in a class in the hierarchy, an error message is pushed on a stack accessible by the error handler subject to certain conditions. In one embodiment, the conditions include either the recoverability of the error, the severity of the error, or both. In an embodiment in which a condition is recoverability, an error that is successfully recovered does not require an error message be pushed on the stacks as no further handling is required.

If an error message is pushed on the stack, an error signal is then returned to the calling class. Unless the error is such that it can be recovered or ignored, the error will be propagated to the application, making an initial call to the hierarchy, with each class along the way adding its own error message to the stack within the base class.

DETAILED DESCRIPTION OF THE INVENTION

Figure 1:
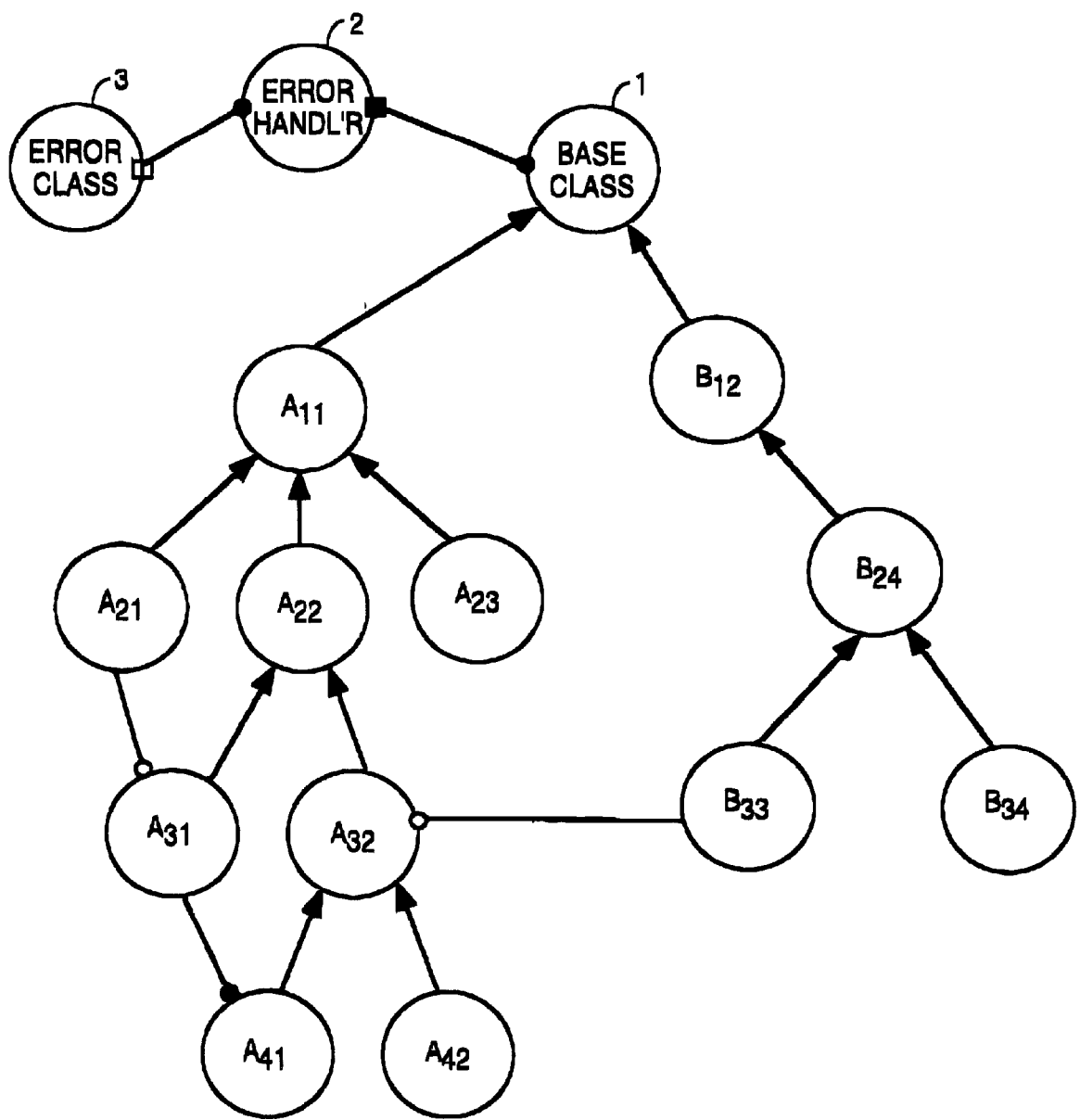
FIG. 1 is a diagram of an inheritance hierarchy of one embodiment of the invention.

FIG. 1 is a diagram of an inheritance hierarchy of one embodiment of the invention. A base class 1 is a common ancestor used to derive two distinct unrelated inheritance trees, an A-tree and a B-tree. The A-tree and the B-tree are related only inasmuch as they are derived from the common ancestor. One of ordinary skill will recognize that this permits independent development of the A and B trees while still allowing them to be readily assimilated into the single inheritance hierarchy at the end of the day. Base class 1 has an error handler class 2 nested therein. Similarly, error handler class 2 has a plurality of error classes 3, one for each error the error handler class is expected to handle. Base class 1 can also store all state information for the hierarchy. Accordingly, all members of the hierarchy can determine the state of each other member of the hierarchy by calling an appropriate function in the base class which will check the stored information and return the state information sought. In FIG. 1, a line ending in an arrow indicates that the class at the head of the arrow is the parent of the class at the tail of the arrow. A solid circle such as that on the line connecting the error handler 2 with the base class 1 indicates that the class at which the circle exists has the other class nested therein. Here, error handler class 2 is nested within base class 1. An open circle indicates that a friendship relation exists between the two classes. For example, class $B_{33}$ is used by class $A_{42}$ as indicated by the friendship relationship notated.

By unifying the inheritance hierarchy under a base class with error handler class 2 nested therein, the error state of any class in the hierarchy is made readily available to the other classes in the hierarchy. When an error occurs from which the class hierarchy is unable to recover, the class in which the error occurs pushes an error message onto the stack and notifies a calling class that an error has occurred. The calling class checks the severity of the error and if severe and unrecoverable, pushes the calling class' own error message to the stack and notifies its caller. In this manner, error messages for a chain of calling classes of arbitrary length are added to the stack for handling by error handler 2. A typical error message includes fields for: (i) an error code, (ii) a line number, (iii) a file name, (iv) a help ID, (v) a severity indicator, (vi) a class ID, and (vii) an additional description. The stack will generally be allocated to be deep enough to hold error messages of up to the maximum depth of the hierarchy. In one embodiment, the stack is circular so that if the stack is "full," the most recent error message will be written to the bottom of the stack. The stack may then continue to add more messages, but each added message overwrites a preexisting message.

Figure 2A:
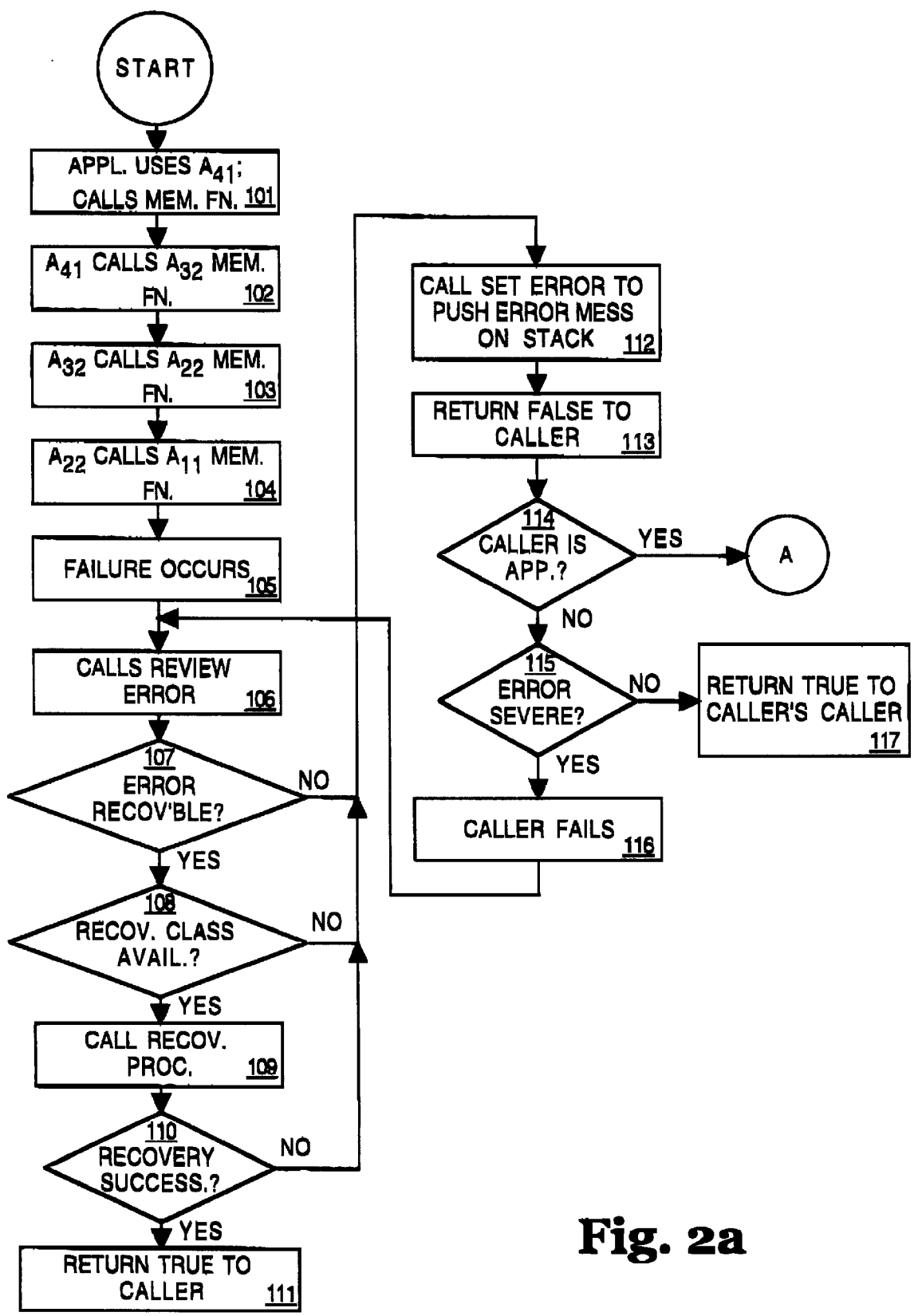
FIGS. 2a and 2b are flowcharts depicting one example of flow in one embodiment of the invention.
Figure 2B:
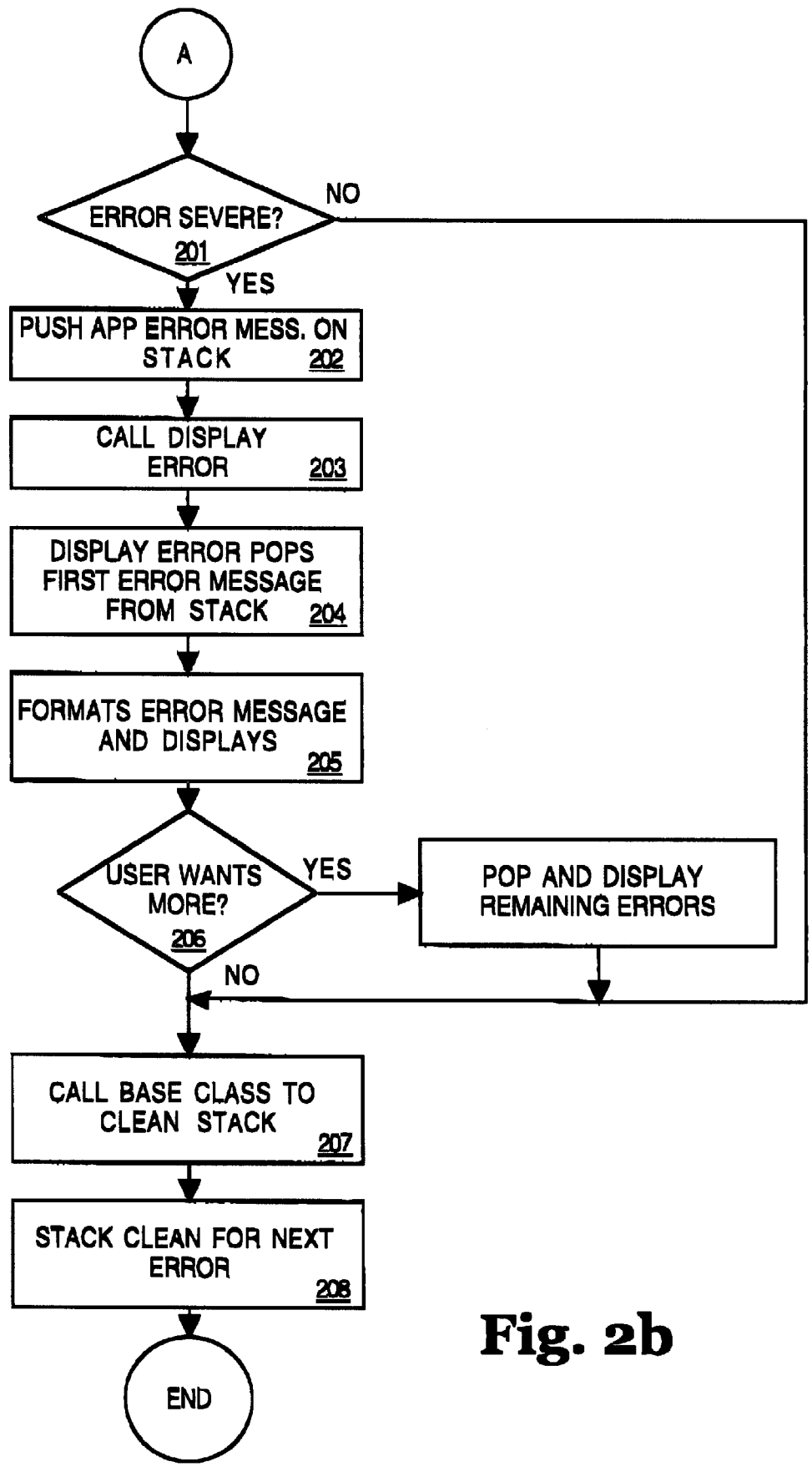

FIGS. 2a and 2b are a flowchart depicting one example of flow in one embodiment of the invention. At functional block 101, an application uses class $A_{41}$ by calling a member function of class $A_{41}$. At functional block 102, $A_{41}$ calls a member function in its parent class $A_{32}$. Class $A_{32}$ calls a member function of its parent class $A_{22}$ at functional block 103. At functional block 104, class $A_{22}$ calls a member function of its parent class $A_{11}$. At functional block 105, a failure occurs in the member function of class $A_{11}$.

At functional block 106, the class in which the error occurred, here $A_{11}$, generates an error message and calls review error routine which is part of the error handler nested in the base class. At decision block 107, the review error routine determines whether the error is the type which is recoverable. If the error is recoverable, at decision block 108, a determination is made whether a recovery class is available. If so, at functional block 109, the base class calls the recovery procedure to attempt recovery from the error. A determination is then made if the recovery has been successful at decision block 110. If it has been successful, effectively no error exists and $A_{11}$ would return "true" to its caller (here $A_{22}$). If, at decision block 107 the error is not recoverable, at decision block 108, the recovery class is not available or at decision block 110, the recovery effort is unsuccessful, the class in which the error occurs calls SET ERROR at functional block 112.

SET ERROR is a member function of the error handler nested in the base class and is, therefore, accessible to all classes in the hierarchy which are derived from the base class. SET ERROR pushes the error message onto a previously allocated stack. Typically, the stack will be allocated as a circular stack having a depth at least equal to the maximum depth of the inheritance hierarchy. After calling SET ERROR, the class in which the error occurs returns "false" to its caller at functional block 113. At decision block 114, a determination is made if the caller is the application. If not, a determination is made if the error is severe at decision block 115. If the error is severe, the caller also fails at functional block 116. If the error is not severe, the caller returns true to its caller at functional block 117.

FIG. 2b is a flowchart of operation after false has been returned to the application of the severity of the error. If the caller is the application, a determination is made at decision block 201. If the error is severe, the application pushes an error message onto the stack at functional block 202. At functional block 203, the application calls a DISPLAY ERROR routine in the base class. The DISPLAY ERROR routine pops the first error message from the stack at functional block 204 and formats and displays the error message at functional block 205. This may be in the form of, for example, a dialog box on the screen. A user is given the opportunity to request more information by, for example, a soft button displayed on the screen with some notation such as "help" or "more info." If the user indicates they want more info at decision block 206, the DISPLAY ERROR routine pops and displays the remaining errors at functional block 209. While the base class provides the DISPLAY ERROR routine which will display errors in a default format, DISPLAY ERROR is also provided with the ability to call back the application and use the applications error display formatting and display routine to keep error handling transparent to the user. If the error is not severe at decision block 201 or the user does not want more at decision block 206, the base class is called to clean the stack at functional block 207. At functional block 208, the stack has been cleaned for the next incoming error.

Assuming for purposes of example that the errors are not recoverable and are severe, error messages will be iteratively added to the stack until false is returned to the application. As one example, the failure at 105 might be, e.g., "unable to allocate buffer." Review error is called at functional block 106. It is determined at decision block 107 that the error is not recoverable. Accordingly, $A_{11}$ calls SET ERROR and pushes the "unable to allocate buffer" error onto the stack at functional block 112. At functional block 113, $A_{11}$ returns false to $A_{22}$. Since $A_{22}$ is not the application and the error is severe, $A_{22}$ fails at functional block 116. The error in $A_{22}$ may be, e.g., "unable to write byte X." Since we have assumed this error to be uncorrectable, $A_{22}$ will call SET ERROR to push the "unable to write byte X" error on the stack. It will then return false to its caller $A_{32}$ which is also not the application and will also fail at functional block 116. The error in $A_{32}$ might be "unable to write record Y" (which contains byte X). This error being non-recoverable will be pushed onto the stack, and "false" will be returned to $A_{41}$. Since $A_{41}$ is not the application, and the error is severe, $A_{41}$ fails. $A_{41}$'s error might be "unable to write file Z" (which contains Y) will, in turn, be pushed onto the stack as non-recoverable, and "false" will be returned to the application. Upon receiving false from class $A_{41}$, the application will verify the severity of the error, add its own error message to the stack, and begin the display error sequence as discussed above.

Because the first error displayed will be the error pushed on the stack by the application and may not be particularly useful to the programmer, for example, the application might push on the error "invalid transaction." This error is unlikely to be of much use to the programmer. However, the ability to determine the underlying cause (in the above example, memory allocation error) permits the programmers to readily identify the class object and, in many cases, the member function causing the error.

Figure 3:
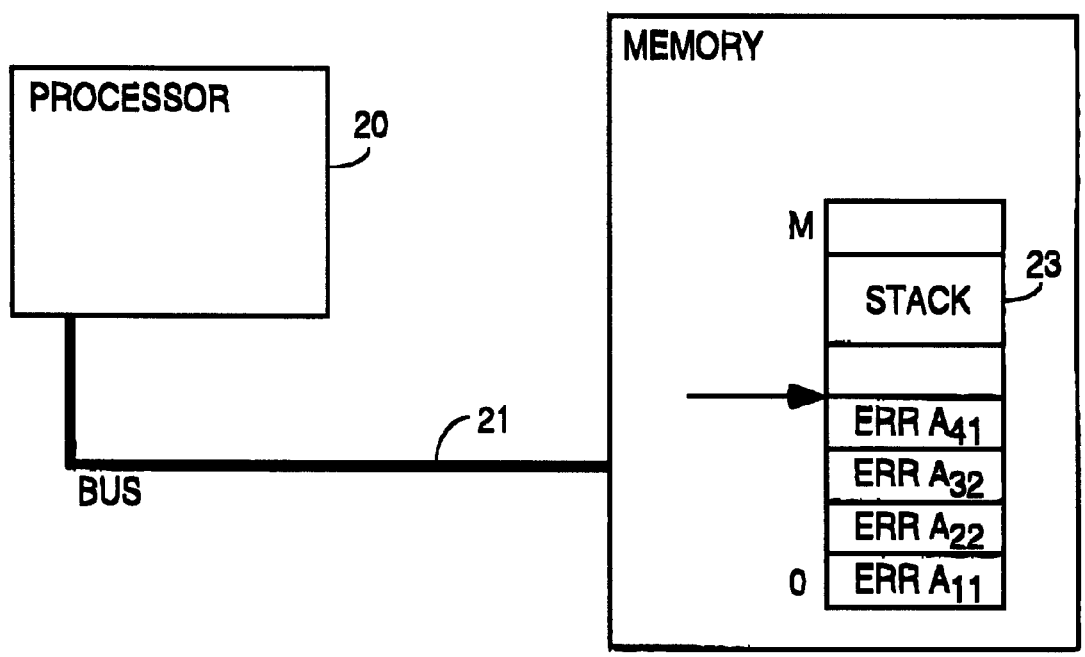
FIG. 3 is a block diagram of a system employing one embodiment of the invention.

FIG. 3 is a block diagram of a system employing one embodiment of the invention. A processor 20 is coupled by a bus 21 to a memory 22. A memory 22 has a circular stack 23 of depth M, where M is equal to or greater than the maximum depth of the inheritance hierarchy that uses the stack. When an error occurs in the class hierarchy, the class in which the error occurs calls to SET ERROR in the base class to push an error message onto the stack 23. In FIG. 3, the stack 23 reflects that unrecoverable severe errors occurred in classes $A_{11}$, $A_{22}$, $A_{32}$, and $A_{41}$. This is a snapshot of the stack after "false" has been returned to the application and before the application has pushed its error onto the stack or any display of errors has occurred.

Figure 4:
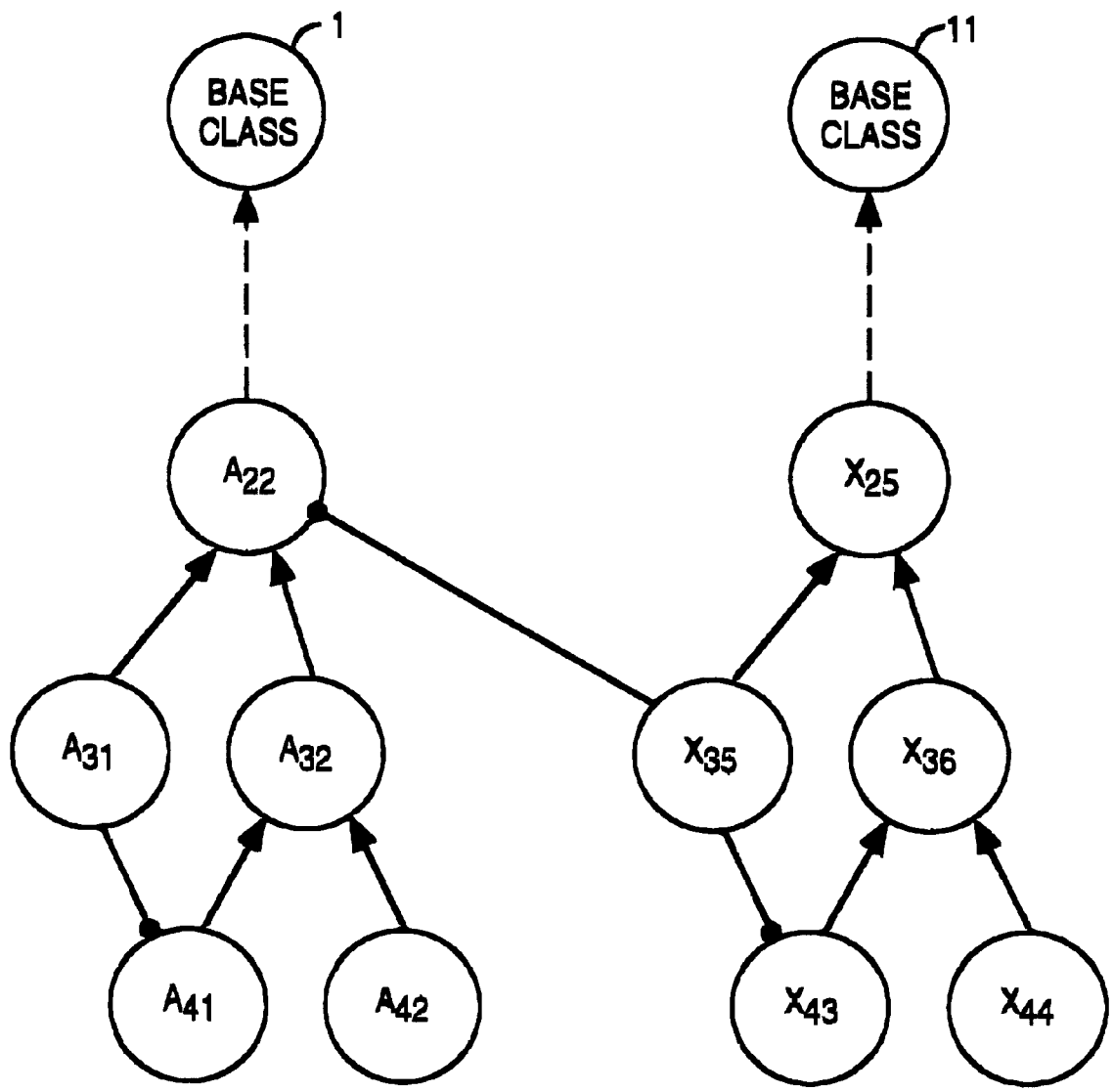
FIG. 4 is a diagram of two partial inheritance hierarchies derived from distinct instantiations of the base class.

FIG. 4 is a diagram of two partial inheritance hierarchies derived from distinct instantiations of the base class. Base class 1 is the same base class of FIG. 1 with only part of the A-tree shown in FIG. 4. Base class 11 has all the characteristics of Base class 1, but has the X-tree derived therefrom. In this diagram, class $X_{35}$ (a leaf on the X-tree) is nested within class $A_{22}$. A question arises as to how to handle errors occurring in the X-tree when the call originated in the A-tree. For ease of description, base class 1 will be referred to as base class$_A$, and base class 11 will be referred to as base class$_X$.

Figure 5:
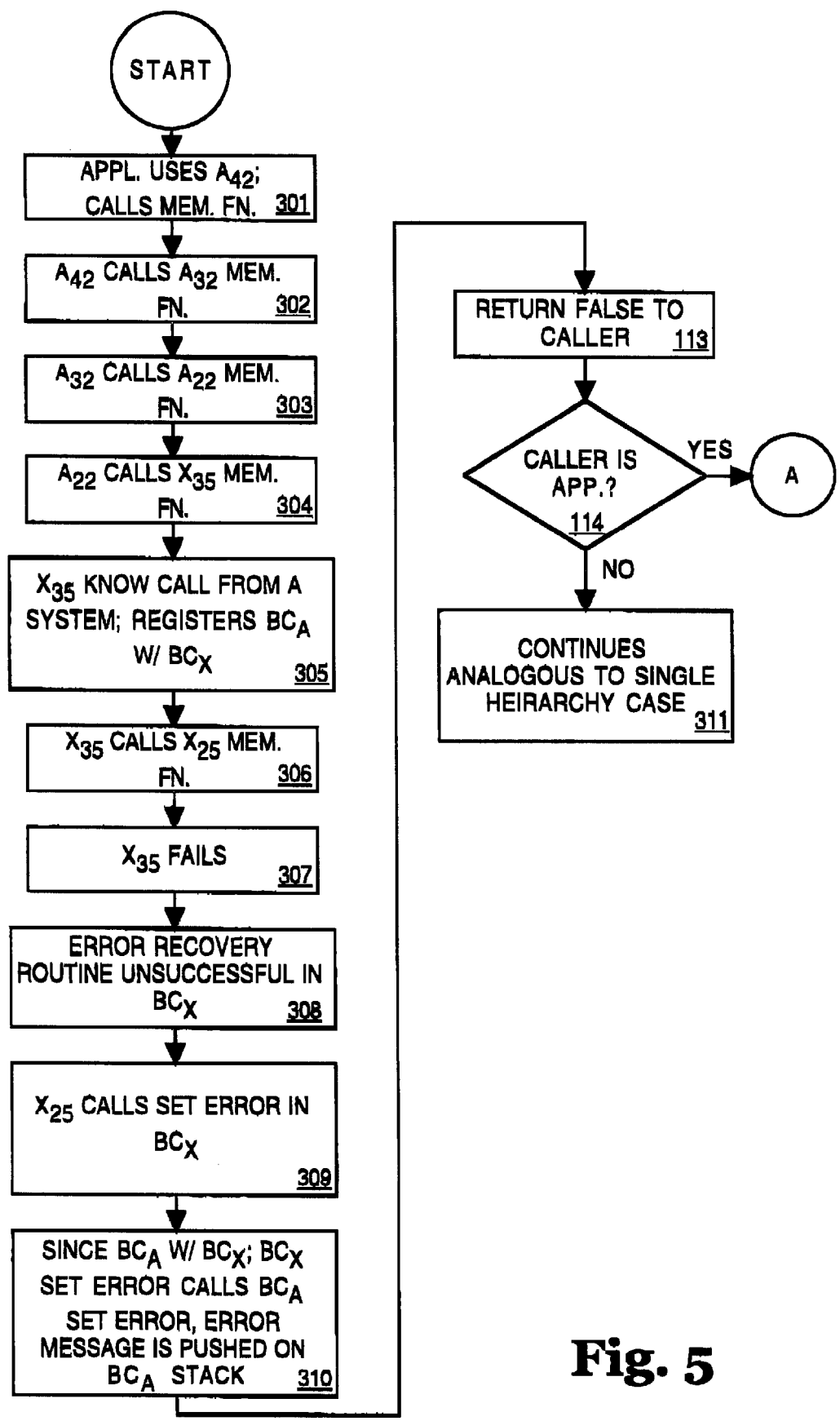
FIG. 5 is a flowchart with one example of handling errors in a case of interhierarchy nesting.

FIG. 5 is a flowchart with one example of handling errors in interhierarchy nesting. In functional block 301, the application uses $A_{42}$ by calling a member function in $A_{42}$. At functional block 302, class $A_{42}$ calls a member function in class $A_{32}$. At functional block 303, $A_{32}$ in turns calls a member function in class $A_{22}$. At functional block 304, class $A_{22}$ calls a member function in class $X_{35}$, which is nested within class $A_{22}$ (but not part of the hierarchy containing $A_{22}$). At functional block 305, class $X_{35}$ knows that its call originated from the A hierarchy. Accordingly, it registers base class$_A$ with base class$_X$. At functional block 306, class $X_{35}$ calls a member function of class $X_{25}$. At functional block 307, class $X_{25}$ fails. Functional block 308 corresponds to blocks 106 through 111 of FIG. 2a. For purposes of this example, we assume that any recovery attempt in functional block 308 was unsuccessful. Significantly, this recovery attempt occurs within base $class_x$, and does not involve base $class_A$ in any fashion.

At functional block 309, class $X_{25}$, having failed to recover from its error, calls SET ERROR in base $class_x$. At function block 310, base $class_x$ having previously had base $class_A$ registered therewith, responds by calling the SET ERROR routine in base $class_A$. This results in the error message of class $X_{25}$ being pushed on the base $class_A$ stack. At functional block 113, "false" is returned to the caller (here $X_{25}$ returns "false" to $X_{35}$). At decision block 114, a check is made to determine if the caller is at the application. If it is not, at functional block 311, the iterative stacking of errors on the base $class_A$ error stack continues analogous to the description of FIG. 2a above. Here, for example, assuming severe errors and no recovery, class $X_{35}$ will call SET ERROR in base class X which will then initiate a call of SET ERROR in base $class_A$, and the error from class $X_{35}$ will be pushed on the base $class_A$ stack. False will then be returned to $A_{22}$, which will similarly push its error on the base $class_A$ stack, and so on until the application is the caller and 13 goes forward exactly as described with reference to FIG. 2b above.

Figure 6:
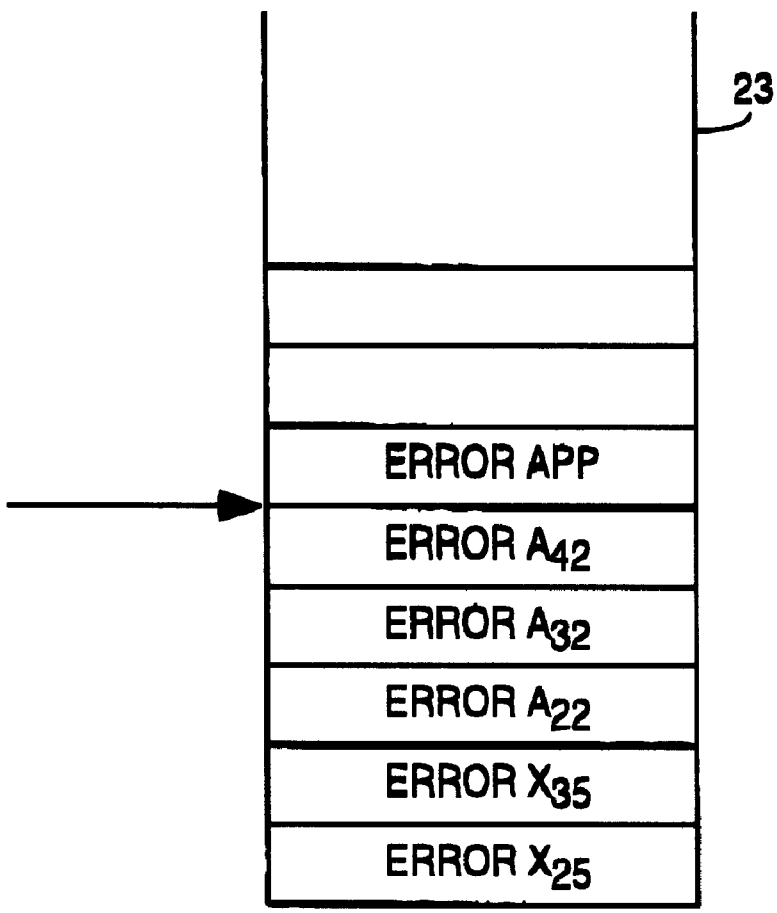
FIG. 6 is a diagram of the stack handling an interhierarchy error.

FIG. 6 shows stack 23 of base $class_A$ immediately before the DISPLAY ERROR routine is called assuming an error is described in FIG. 5 above. Again, the top error in the stack is the error pushed on by the application, followed by the error pushed on by class $A_{42}$, $A_{32}$, $A_{22}$, $X_{35}$ and $X_{25}$ in that order. Notably, the stack of base class X remains empty. Again, this permits all errors occurring within a hierarchy to be handled and displayed from the base class of the hierarchy through which calls were initiated. In this example, the interaction of two distinct hierarchies is illustrated. One of ordinary skill will recognize that this methodology can be extended to an arbitrarily large number of hierarchies with all errors being accumulated in one place. This is particularly useful since often times hierarchies will be independently developed and the ability to readily plug one hierarchy into the next, without loss of error tracking functions or error handling functions, is highly advantageous.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A method comprising:

deriving a first inheritance hierarchy of arbitrary depth from a first base class having an error handler class nested inside;

establishing a relationship between a first derived class in the first hierarchy and a second derived class in a second inheritance hierarchy derived from a second base class, the second base class being a different instance of the first base class;

registering the first base class with the second base class if a call originates in the first hierarchy and calls a member function of the second hierarchy;

calling the error handler from a derived class in response to an error occurring in the derived class;

pushing an error message onto a stack within the error handler responsive to the calling step; and returning an indication that the error occurred to a class calling the derived class.

2. The method of claim 1 further comprising the steps of:

receiving in the second base class a call to handle an error in a failing derived class within the second hierarchy after the first base class is registered with the second base class;

calling the first base class to handle the error; and pushing an error message from the failing derived class onto the stack in the first base class.

3. The method of claim 1 further comprising the step of:

reviewing the error occurring in the derived class to determine if the error is recoverable;

calling an error recovery routine from the first base class to recover from the error if the error is recoverable, wherein if the recovery is successful, no error indication is returned to the class calling the derived class.

4. The method of claim 1 further comprising the steps of:

appending an indication of error severity to the error message.

5. The method of claim 4 further comprising the steps of:

checking a severity of the error; and returning the error signal to the calling class only if the error is severe.

6. The method of claim 1 further comprising the steps of:

displaying a first error message on a display device; and displaying additional error messages responsive to user request.

7. The method of claim 6 wherein the step of displaying comprises the steps of:

calling an error display class;

popping a first error message from the stack within the first base class; and popping the remaining messages from the stack responsive to a user request.

8. The method of claim 7 further comprising the step of:

clearing the stack once an error has been one of displayed and determined not severe.

* * * * *